(12) United States Patent
Lee

(10) Patent No.: US 9,842,176 B2
(45) Date of Patent: Dec. 12, 2017

(54) SYSTEM AND METHOD FOR DESIGNING AND VALIDATING COMPUTING SYSTEMS

(71) Applicant: ORACLE INTERNATIONAL CORPORATION, Redwood Shores, CA (US)

(72) Inventor: Michael B. Lee, Roseville, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 822 days.

(21) Appl. No.: 14/270,756

(22) Filed: May 6, 2014

(65) Prior Publication Data

US 2015/0324487 A1 Nov. 12, 2015

(51) Int. Cl.
*G06F 9/44* (2006.01)
*G06F 13/10* (2006.01)
*G06F 13/12* (2006.01)
*G06F 17/50* (2006.01)
*H04L 12/24* (2006.01)

(52) U.S. Cl.
CPC .......... *G06F 17/50* (2013.01); *H04L 41/145* (2013.01); *G06F 2217/06* (2013.01); *G06F 2217/68* (2013.01)

(58) Field of Classification Search
None
See application file for complete search history.

(56) References Cited

U.S. PATENT DOCUMENTS

| | | | |
|---|---|---|---|
| 2002/0183982 A1 | 12/2002 | Rauscher | |
| 2007/0078635 A1* | 4/2007 | Rasmussen | G06F 1/20 703/1 |
| 2008/0091387 A1* | 4/2008 | Yamazaki | G06F 17/509 703/1 |
| 2011/0016368 A1* | 1/2011 | Ayachitula | G06F 21/73 714/746 |
| 2011/0106501 A1* | 5/2011 | Christian | H04L 67/16 703/1 |

OTHER PUBLICATIONS

Gliffy, Inc.; Design Build-Outs and Share Plans with Gliffy's Network Diagrams; downloaded on Oct. 30, 2013 from http://www.gliffy.com/uses/network-diagram-software/, pp. 1-2.
Sparx Systems; Visual Modeling Platform; Enterprise Architect—UML Design Tools and UML Case tools for software development; downloaded on Oct. 29, 2013 from http://www.sparxsystems.com/products/ea/, pp. 1-6.

* cited by examiner

*Primary Examiner* — Cedric D Johnson
(74) *Attorney, Agent, or Firm* — Cooper Legal Group, LLC

(57) ABSTRACT

Systems, methods, and other embodiments associated with designing computing systems are described. In one embodiment, a method includes generating a design that defines a computing system with at least a set of servers and connections between the set of servers to indicate an arrangement of the set of servers within the computing system. The method includes validating the design by determining whether the connections defined between the set of servers violate one or more of a set of design constraints. Validating the design includes using attributes of the set of servers to analyze the connections defined between the set of servers.

18 Claims, 4 Drawing Sheets

SYSTEM AND METHOD FOR DESIGNING AND VALIDATING COMPUTING SYSTEMS

BACKGROUND

Complex computing systems that provide large scale computing services include many components. For example, the components may include servers, storage devices, various networks and associated connections and so on. The nature of such computing systems is intrinsically complex. Consequently, designing and documenting a large scale computing system is time intensive and often prone to errors even though designers are highly skilled. Accordingly, when errors are present in the documentation and/or when various components are configured incorrectly in the design, difficulties with implementing the computing system according to the design may occur. Thus, the errors may result in time delays and additional costs, which cause inefficiencies.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments are described herein that generate and validate designs of computing systems. In one embodiment, the system includes a graphical user interface (GUI) configured to generate a constraint driven infrastructure design of disparate physical assets in a computing system. The GUI provides for generating the design via drag and drop inputs that add components (i.e., physical assets) to the design and define/assign relationships between components in the design. Additionally, as the design is generated, components and relationships between the components may be validated according to one or more constraints. In one embodiment, the system actively monitors the components and relationships created in the design against the design constraints to avoid design errors. Reducing the amount of design errors during the design process helps to reduce problems and difficulties when implementing the computing system.

Figure 1:
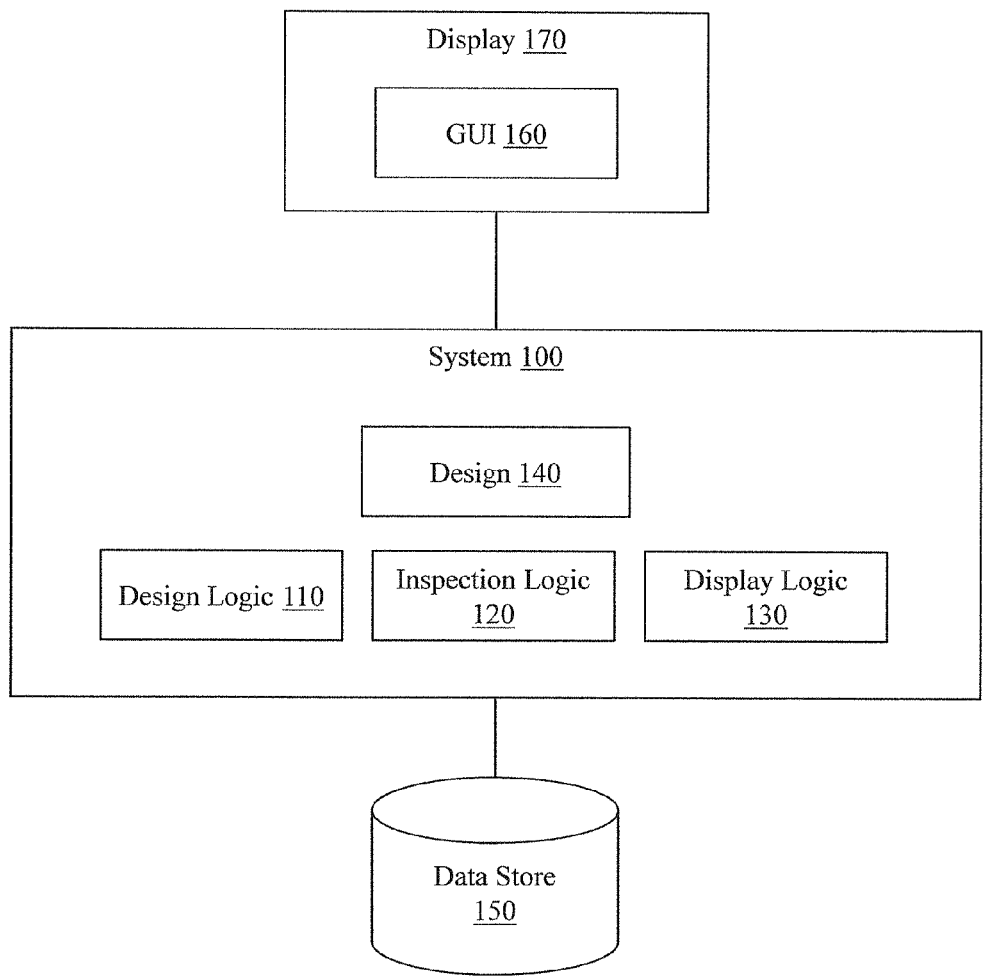
FIG. 1 illustrates one embodiment of a system associated with generating and validating designs of a computing system.

With reference to FIG. 1, one embodiment of a system 100 associated with generating and validating a design of physical assets for a computing system is illustrated. System 100 is implemented in and performed by a computer. In one embodiment, the system 100 includes design logic 110, inspection logic 120 and display logic 130. The system 100 may be an executable application configured to generate a design of a computing system based on user inputs and/or predefined system components. The design logic 110 is configured to use representations of system components (i.e., representations of physical assets) to generate a design 140. The system components are defined according to attributes for each component and are stored in a data store 150.

To initiate the creation of a design or to modify an existing design, the system 100 is executed. In one embodiment, the display logic 130 generates a graphical user interface (GUI) 160 on a display 170. A designer or other user interacts with the GUI 160 via the display 170 to provide inputs regarding the design, which are received by the design logic 110. Accordingly, the GUI 160 provides an interactive environment for the designer to provide inputs to the design logic 110 when generating the design 140.

In one embodiment, the system 100 is configured to generate a design that defines a computing system. The generated design includes a set of servers and connections between the set of servers/computers to indicate an arrangement of the set of servers within the computing system. Of course, other types of components (e.g., storage components, network components, security appliances, etc.) may be added as desired. As will be described herein, the system 100 also validates the design by using attributes of the set of servers and/or components to analyze the connections and determine whether the connections violate one or more of a set of design constraints.

In general, the design 140 may be initially empty and the design logic 110 is configured to iteratively add components to the design according to inputs received via the GUI 160. That is, the GUI 160 may display an empty or previously generated design (e.g. the design 140) to the designer so that the designer can, for example, use drag and drop inputs to cause the design logic 110 to add components to the design 140, to cause the design logic 110 to add relationships/associations between components in the design 140, to modify the design 140, and so on.

To assist the user to build a design of a computing system, a library of predefined system components are maintained in the data store 150. The predefined system components may include illustrated objects that represent servers, cables, networking equipment, storage devices, interfaces, peripheral devices, and other types of computer equipment. Each component may also include predefined attributes that describe properties/specifications of the component. As will be described below, the attributes of the component may be used to validate how the component is used in a design and/or whether relationships added to the component (e.g., connections to other components) in the design are used properly. The design logic 110 is configured to add components to the design 140 from the library of system components as the components are selected by the user via the GUI 160.

Additionally, as features are added to the design 140, the inspection logic 120 evaluates and validates the added features (i.e., components and/or relationships) according to a set of constraints. In one embodiment, the inspection logic 120 is configured to determine whether adding the components and/or adding the relationships between components violate one or more of the set of constraints.

For example, suppose it is known that two types of computers are incompatible with each other. A constraint may be defined that prohibits the two types of computers to be connected to each other in the design. If the user attempts to connect the two types of computers in a design that is being built, the inspection logic 120 validates the connection and determines that the connection is not permitted due to a constraint. The inspection logic 120 is configured to prohibit the connection between two components from being included in the design and/or generate an error message when a constraint violation is detected. Of course, many other types of design constraints may be predefined. It is improbable that a user can remember all such constraints for designing a computing system. Thus the system 100 provides for automatically validating the design using the predefined constraints.

In general, the inspection logic 120 is configured to evaluate added features by comparing attributes of components to the set of design constraints and/or comparing attributes of separate components that are associated with an added relationship. In this way, the inspection logic 120 monitors the design 140 for violations and prevents errors from being introduced into the design 140 as the design 140 is generated.

Consider one example where a component (e.g., a server blade) is added to another component (e.g., a server rack). In this example, the inspection logic 120 may compare attributes (e.g., specifications) of the server blade to attributes of the server rack (e.g., number of empty slots, specifications supported by available slots, etc.) to determine whether adding the component is incompatible. Additionally, the inspection logic 120 may undertake additional evaluations to determine whether a desired configuration (e.g., cost limit, heat limit, etc.) as defined by the set of constraints is violated when adding the server blade to the server rack.

In another example, suppose the user adds a network connection between two computers in the design. The network connection is a "relationship." The inspection logic 120 is configured to compare attributes of the components that will be connected together along with attributes of the type of connection added (e.g., a connecting cable) to determine whether the relationship violates any constraints of the components or of the overall design. For example, an incompatible network cable may have been selected by the user. Based on the comparison, the inspection logic 120 allows or prohibits the user to add the relationship to the design. In this way, the system 100 can intelligently generate the design 140 of a complex computing system and ensure that the design 140 complies with the set of constraints.

Furthermore, the set of constraints may indicate a deeper analysis than a simple comparison of attributes. For example, the set of constraints may indicate a minimum threshold for a constraint even though two components may be otherwise compatible. The set of constraints may indicate a certain arrangement or connection order for components. Accordingly, the inspection logic 120 may further analyze the added feature against the set of constraints. For example, the inspection logic 120 may not only compare attributes, but may also determine whether the relationship violates any of the additional constraints.

Subsequently, if the inspection logic 120 determines a violation is present, then the inspection logic 120 is configured to, for example, prevent the offending condition from occurring, indicate an error exists, or otherwise identify the violation for correction. In this way, the user is alerted of potential defects so that the defect may be corrected. Thus incorrectly configured designs can be avoided.

Returning briefly to the GUI 160, the display logic 130 is configured to generate the GUI 160 to permit various user actions and inputs from a user/designer. For example, various types of user actions or inputs may include: drag and drop inputs of components into the design 140, inputs that link components according to a selected relationship/connection, inputs that modify attributes of components and so on. In general, the display logic 130 provides the inputs to the design logic 110 so that the design logic 110 may generate/modify the design 140 according to the inputs.

In one embodiment, when modifications to the design occur, the inspection logic 120 performs a validation process to determine whether any design changes violate a design constraint. For example, the inspection logic 120 prevents the GUI 160 from accepting inputs that violate the set of design constraints. In this way, the system 100 can provide feedback to the user/designer so that violations/errors are not introduced and/or can be remedied. For example, when an input results in a violation or other error, the inspection logic 120 is configured to cause the GUI 160 to indicate the violation/error to the user (e.g., a visual signal, error message, etc.).

Additionally, the display logic 130 may generate the GUI 160 with a representation of the design 140 along with a toolbar or other set of tools and features for manipulating the design 140. For example, the toolbar may include icons for the plurality of system components stored in the data store 150, tools for adding connections, tools for generating relationships between components, tools for performing design analysis (e.g., error checking, report generating, etc.) and so on. Furthermore, the display logic 130 configures the toolbar and associated icons to be responsive to drag and drop inputs in order to make interactions with the GUI 160 intuitive.

In general, the computing system may be an enterprise solution, an infrastructure computing system or some other large scale computing system that provides computing services using a plurality of hardware components with a plurality of different connections and associations between components. The design logic 110 generates the design 140 of the computing system to include a set of components that represent a layout of the computing system. Additionally, the design 140 is generated to include relationships/associations between components in the set of components. Furthermore, the set of components and the relationships/associations include metadata that describe various attributes and specifications of the set of components and the relationships/associations.

In one embodiment, the design 140 is generated as a document that defines a schematic, layout, arrangement or general configuration of the set of components within the computing system that is being designed. For example, the design 140 is generated to include components such as server racks, server blades/sub-components that are installed in the server racks, storage devices, power supplies, power strips, power backups, cables, connectors, routers, bridges, access points, other networking components and so on. In general, the design 140 includes physical assets (i.e., hardware) that makeup the computing system and also includes descriptions/diagrams of connections/links between the physical assets. In this way, the design 140 may be used to document and implement the computing system along with being used by the inspection logic 120 to generate reports about the computing system.

In one embodiment, the plurality of system components are defined and stored in the data store 150. Components from the plurality of system components are subsequently used by the design logic 110 to generate the design 140. For example, the design logic 110 is configured to define system components according to various attributes and store the system components in the data store 150. Thus, the data store 150 includes the plurality of system components as a repository of components that may be added to the design 140.

In one embodiment, the data store 150 includes components that are defined according to physical assets from different manufacturers. In one embodiment, the plurality of system components include representations for different models of components, template components and so on. In general, the plurality of system components are defined with attributes that describe different physical assets. For example, a server may have attributes including a manufacturer ID, a model number, specifications (e.g., processor speed, amount of memory), a number of ports, power usage and so on. Components defined in the data store 150 may each have a set of attributes that define the particular component. That is, a server may have attributes that specify processing speed or a maximum load, while a router may have attributes that indicate a number of ports, communication speeds associated with each port and so on.

Furthermore, while components are discussed as being generically stored in the data store 150, of course, components may be added, deleted, or modified within the data store 150. In one embodiment, the design logic 110 is configured to define the plurality of system components according to attributes provided via, for example, the GUI 160 or another input. In this way, the plurality of system components can be customized in the data store 150 for a particular design.

Figure 2:
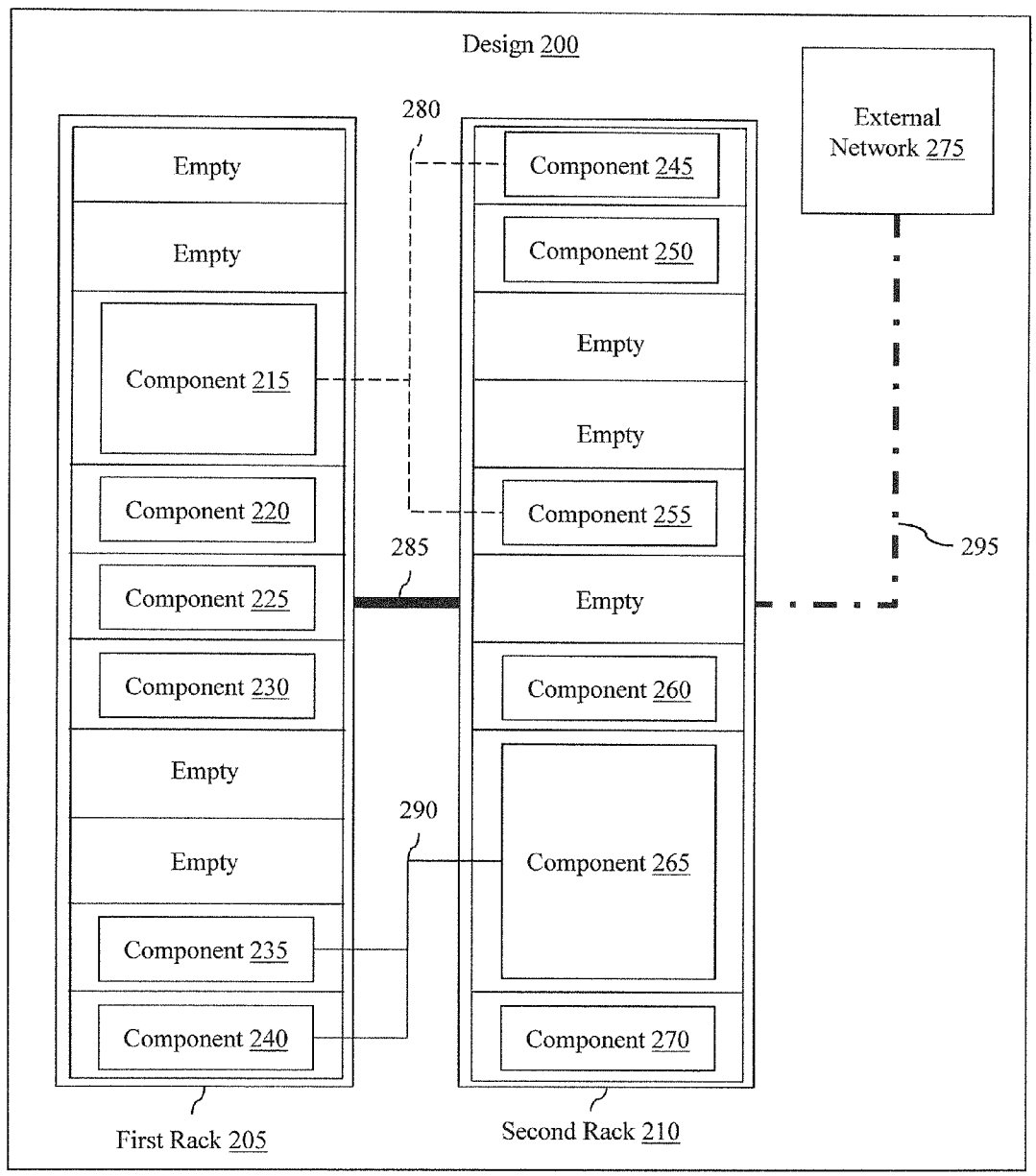
FIG. 2 illustrates one embodiment of a design generated by the system of FIG. 1.

With reference to FIG. 2, one embodiment of a design 200 for a computing system is illustrated. FIG. 2 will be discussed along with elements from the system 100 of FIG. 1. Additionally, the design 200 will be discussed as being generated by the system 100 and as being displayed within the GUI 160. Accordingly, in this example, the display logic 130 causes the design 200 to be rendered within the GUI 160 on the display 170. Furthermore, the GUI 160 will be discussed as including one or more tool bars with buttons/icons for editing the design 200.

The design 200 includes a first rack 205 and a second rack 210 that are computer racks for holding computer components in slots. As seen in FIG. 2, various components are shown in slots while other slots are labeled "empty." The first rack 205 and the second rack 210 are examples of components from the library of system components stored in the data store 150. Accordingly, library definitions of the first rack 205 and the second rack 210 include associated metadata that defines various aspects of the components such as specifications, model numbers and so on.

In one example, the first rack 205 and the second rack 210 are design components that have been dragged from one of the toolbars and dropped onto the design 200. From this drag and drop input, the design logic 110 adds the racks 205 and 210 to the design. Furthermore, the racks 205 and 210 are added to the design 200 with attributes previously defined when stored in the data store 150. However, in one embodiment, the design logic 110 may selectively alter attributes of the racks 205 and 210 to customize the instances in the design 200. In this way, components in the design 200 can be customized according to an exact configuration that is used to implement the computing system.

Additionally, the inspection logic 120 ensures that adding the racks 205 and 210 does not violate any constraints that govern the design 200. That is, the inspection logic 120 analyzes a set of constraints (e.g., compatibility constraints, cost constraints, physical dimension constraints, etc.) against attributes of the racks 205 and 210 to ensure the design 200 remains valid and error free.

As generation of the design 200 progresses, components 215, 220, 225, 230, 235 and 240 (hereinafter collectively referred to as components 215-240) are added to the first rack 205 by the design logic 110 according to inputs received via the display logic 130. In one embodiment, the inspection logic 120 analyzes the components 215-240 when added. For example, the inspection logic 120 analyzes the components by evaluating how a component is added (e.g., to another component, separate from a component). If a new component is free standing and not added to another component, then the inspection logic 120 initially evaluates just the new component.

However, in one embodiment, the inspection logic 120 is configured to analyze attributes of the new component and attributes of associated components to determine whether adding the new component violates any design constraints. For example, the component 215 is added to the first rack 205. Accordingly, the inspection logic 120 analyzes attribute of the component 215 and attributes of the first rack 205 to determine whether adding the component 215 causes a violation. In this way, the design 200 is intelligently generated to avoid configuration errors and other constraint violations.

Furthermore, the system 100 similarly validates components 245, 250, 255, 260, 265 and 270 (hereinafter collectively referred to as components 245-270) as the components 245-270 are added to the second rack 210. In one example, the inspection logic 120 analyzes whether any constraints are violated when adding the component 265 to the second rack 210. The inspection logic 120 determines, for example, whether the second rack 210 can accommodate a three segment component since component 265 takes up three slots in the rack, whether the rack 210 can supply sufficient power to the component 265 in addition to a current load, whether connections in the rack 210 are compatible with the component 265 and so on. By evaluating each new component and/or relationship added to the design 200, the inspection logic 120 may prevent incorrect configurations and constraint violations from being introduced into the design 200.

The design 200 also illustrates various relationships between components. Relationships illustrated in the design 200 include connections 280, 285, 290 and 295. Each of the connections 280, 285, 290 and 295 represent a different type of connection between components. For example, connection 285 may be a high throughput connection (e.g., Infiniband) between the first rack 205 and the second rack 210. The connections 280 and 290 are different types of direct connections (e.g., 100 Mbit/s, 1 Gbit/s, etc.) between components of the first rack 205 and the second rack 210. The connection 295 is an external connection between the second rack 210 and an external network 275. Accordingly, as the design logic 110 adds the relationships/connections, the inspection logic 120 undergoes a separate analysis for each of the relationships in view of the set of constraints. In this way, the inspection logic 120 may validate the design 200 against misconfigured connections and other errors.

In another embodiment, the inspection logic 120 may use the design 200 to generate various reports. For example, the inspection logic 120 generates documentation and information about the computing system that is to be implemented from the design 200. The reports may include graphical system design views, network configuration spreadsheets, complete system design parts lists, capacity saturation reports, parts cost estimates, installation cost and time estimates, power consumption forecasts, external connection lists, setup instructions, project plans, required personnel resources, skill level requirements for personnel to implement the design, bill of materials (BOM), bill of personnel resources, client selectable schedules for installation and so on. Thus, the system 100 permits intelligent generation and validation of designs along with compiling comprehensive documentation.

Figure 3:
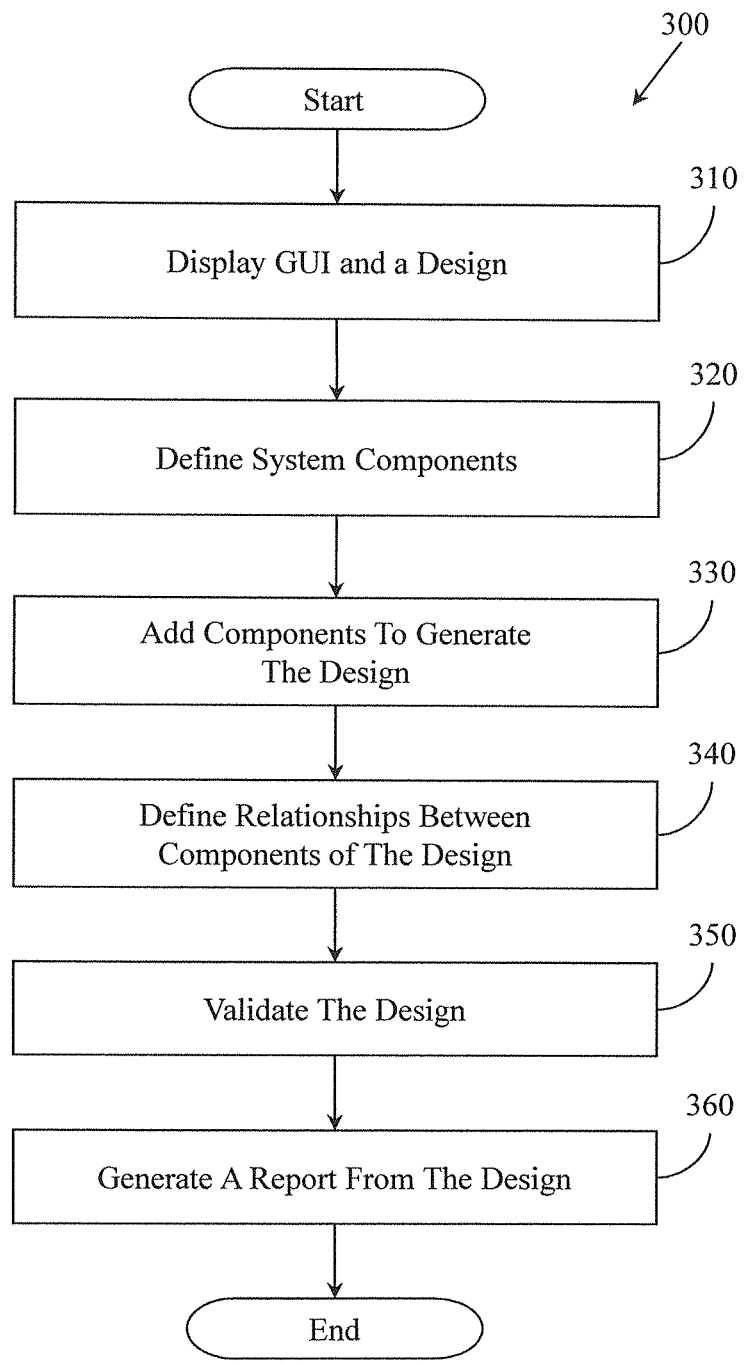
FIG. 3 illustrates one embodiment of a method associated with generating and validating designs of computing systems.

Further aspects of intelligently generating designs of computing systems will be discussed with reference to FIG. 3. FIG. 3 illustrates one embodiment of a computer-implemented method 300 for generating and validating designs of complex computing systems.

In one embodiment, method 300 is initiated when a designer or other user wishes to generate or edit a design. At 310, a graphical user interface (GUI) is generated and displayed. In one embodiment, the GUI is used to display an existing design or a blank canvas (e.g., template) for the design of a computing system. In general, the design is a schematic, diagram or other depiction of an arrangement of the computing system. Furthermore, the computing system is a collection of hardware components that together provide one or more computing services when implemented (e.g., a network of computers, a computing cluster, etc.). Accordingly, the GUI provides a visual representation of the computing system by displaying the design. In addition to displaying the design, the GUI also provides tools for manipulating the design and for providing other inputs to interact with the design.

At 320, system components are defined and stored in a database or other data store. The system components may be in a predefined library of components that are available for inclusion into a design. Thus in one embodiment, block 320 is not part of the sequence shown in method 300. In one embodiment, each system component is defined according to attributes associated with specifications of the component as described previously. The system components represent various hardware elements that can be used to build a computing system. For example, the system components may include servers, network components, server racks, power supplies, power strips, power backups, cables, connections (e.g., different cable categories), routers, bridges, data stores and access points. In general, the system components are a collection of components available for selection for generating computing system designs.

At 330, in response to user inputs and/or commands, components are added to the design in order to define a layout of a computing system. The layout may include a group of computers, other components, and relationships between the components. In one embodiment, at 330, generating the design may include adding a set of components to the design from the library of system components as selected by a user. Additionally, generating the design may be based, at least in part, on a predefined proposal that defines specifications, constraints and other information about the computing system. That is, a client may request certain features in a proposal that can then be used for determining which components to add into the design.

Adding the set of components may occur by iteratively adding components according to one or more inputs. The inputs may be inputs received through the GUI, or, in one embodiment, may be automated inputs. The automated inputs may automatically cause certain components to be added according to, for example, the client proposal or another component that has been added. For example, when an initial component is added the automated input may ensure that supporting components (e.g., power supplies) are also added into the design.

In one embodiment, adding the set of components also includes selectively modifying attributes of components in the set of components. As components are added to the design, some of the components may be modified to configure instances of the components that may be different from components defined in the library of system components. In this way, components can be customized when added to the design to account for variations from standardized components.

At 340, relationships between components in the set of components are added to the design to further define the design. In one embodiment, the relationships are network connections, power connections, direct links, and so on. The relationships may also include associations. For example, the associations may include defining components in a subgroup, in a security group, in a protected zone, in a storage group and so on.

In either case, the relationships may also be added according to inputs received through the GUI or from automated inputs. Additionally, in one embodiment, adding the relationships includes iteratively adding relationships between components of the set of components. Thus, as additional components are added to the design, additional relationships may also be defined in order to associate and connect the various set of components.

At 350, the design is validated. In one embodiment, validating the design includes determining whether the relationships defined between the set of components violate one or more of a set of design constraints. For example, there may be a constraint that prohibits a power supply from being connected to another power supply or prohibits two incompatible computers from being connected to each other, etc. Additionally, validating the design may also include analyzing components as they are added to ensure the addition complies with the set of constraints.

As previously stated, the set of constraints include, for example, specifications for the design, rules for configuring components in the design, and so on. The specifications may include information gathered from a client proposal, information about existing physical constraints, information about existing computing systems that are to be accommodated, and so on. The rules for configuring the design may include rules about when connections are improper between components, improper loads implemented on components, missing connections between components, incompatible connections between components, component mismatches and so on.

Accordingly, the design is validated, in one embodiment, by comparing attributes of components as relationships are added and/or analyzing components and relationships in view of the set of constraints. Furthermore, at 350, when a violation is detected, an offending component or relationship may be voided, prohibited, or otherwise indicated. In one embodiment, an error message or violation message is generated and displayed when a constraint violation is detected.

At 360, at least one report is generated based, at least in part, on the design. In one embodiment, the report is generated to include documentation of the design, implementation information of the design, and/or one or more estimates associated with the design. Additionally, at 360, the at least one report may be generated in response to a request received via the GUI or another input.

Computer Embodiment

Figure 4:
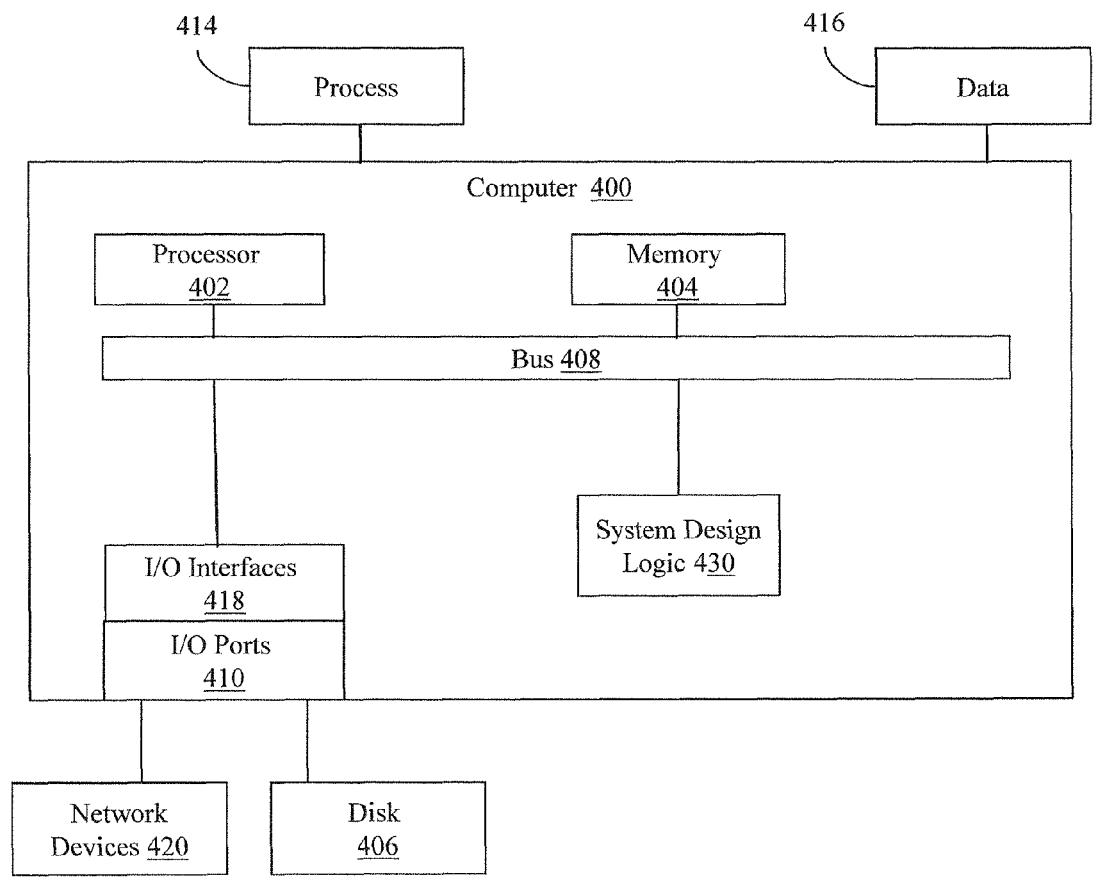
FIG. 4 illustrates an embodiment of a computing system configured with the example systems and/or methods disclosed.

FIG. 4 illustrates an example computing device that is configured and/or programmed with one or more of the example systems and methods described herein, and/or equivalents. The example computing device may be a computer 400 that includes a processor 402, a memory 404, and input/output ports 410 operably connected by a bus 408. In one example, the computer 400 may include system design logic 430 configured to facilitate generating and validating designs for computing systems similar to the design logic 110, inspection logic 120 and display logic 130 of the system 100 shown in FIG. 1. In different examples, the logic 430 may be implemented in hardware, a non-transitory computer-readable medium with stored instructions, firmware, and/or combinations thereof. While the logic 430 is illustrated as a hardware component attached to the bus 408, it is to be appreciated that in one example, the logic 430 could be implemented in the processor 402 as an executable algorithm.

In one embodiment, the system design logic 430 or the computer is a means (e.g., hardware, non-transitory computer-readable medium, firmware) for generating designs for computing systems and performing the functions as described herein.

The means may be implemented, for example, as an ASIC programmed to add components and relationships to a design. The means may also be implemented as stored computer executable instructions that are presented to computer 400 as data 416 that are temporarily stored in memory 404 and then executed by processor 402. The system design logic 430 may also provide means (e.g., hardware, non-transitory computer-readable medium that stores executable instructions, firmware) for validating the design and generating reports about the design as described herein.

Generally describing an example configuration of the computer 400, the processor 402 may be a variety of various processors including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with input/output devices via the I/O interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the I/O interfaces 418, and/or the I/O ports 410. Through the network devices 420, the computer 400 may interact with a network. Through the network, the computer 400 may be logically connected to remote computers. Networks with which the computer 400 may interact include, but are not limited to, a LAN, a WAN, and other networks.

In another embodiment, the described methods and/or their equivalents may be implemented with computer executable instructions as an algorithm. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication," as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-storage medium," as used herein, is a non-transitory medium that stores instructions and/or data. A computer-storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-readable medium described herein are limited to statutory subject matter under 35 U.S.C §101.

"Logic," as used herein, includes a computer or electrical hardware component(s), firmware, a non-transitory computer-storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

An "operable connection," or a connection by which entities are "operably connected," is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User," as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer storage medium storing instructions for execution by a device, the non-transitory computer storage medium comprising:
   instructions configured to:
   generate a design that defines a computing system based upon system component data extracted from a database, wherein the design includes a set of servers and connections between the set of servers to indicate an arrangement of the set of servers within the computing system, wherein the set of servers are added to the design from the database by iteratively adding system components from the system component data to the design;
   validate the design to create a validated design by using attributes of the system components to analyze the connections and determine whether the connections violate one or more of a set of design constraints that include a threshold to determine connection compatibility of the system components in the design, wherein a first attribute of a first system component and a second attribute of a second system component are evaluated to determine whether a connection between the first system component and the second system component is valid with respect to the threshold; and
   utilize the validated design to implement the computing system.

2. The non-transitory computer storage medium of claim 1, wherein the instructions configured to generate the design include instructions configured to:
   (i) add the set of servers according to a first input, and
   (ii) define the connections between the set of servers according to a second input, wherein the connections include one or more connections between the set of servers.

3. The non-transitory computer storage medium of claim 2, wherein the system components include servers, networking equipment, cabling or storage devices,
   wherein the instructions configured to define the connections include instructions configured to iteratively generate relationships that include the connections between servers of the set of servers, wherein the relationships include connections and associations between system components.

4. The non-transitory computer storage medium of claim 1, wherein the instructions configured to generate the design with the set of servers include instructions configured to selectively modify attributes of servers in the set of servers to configure instances of the set of servers within the design, and wherein the design constraints include rules for loads implemented on servers.

5. The non-transitory computer storage medium of claim 1, further comprising:
   instructions configured to display a graphical user interface (GUI) that includes the design to provide a visual representation of the computing system, wherein the instructions configured to display the GUI include instructions configured to receive inputs and display the design based, at least in part, on the inputs that add servers and other system components to the set of servers and define relationships between the set of servers,
   wherein the inputs are drag and drop actions received through the GUI that are based, at least in part, on actions by a user, and wherein the instructions configured to generate the design include instructions configured to generate relationships according to the drag and drop inputs that connect servers in the set of servers.

6. The non-transitory computer storage medium of claim 1, further comprising:
   instructions configured to generate at least one report from the design, wherein the at least one report includes documentation of the design, implementation information of the design and one or more estimates of the design.

7. The non-transitory computer storage medium of claim 1, further comprising:

instructions configured to define a plurality of system components according to attributes associated with each of the system components, wherein the plurality of system components represent system components of the computing system including servers, network components, server racks, power supplies, power strips, power backups, cables, connections, routers, bridges, data stores and access points.

8. The non-transitory computer storage medium of claim 1, wherein the computing system is a collection of hardware components that together provide one or more computing services, wherein the connections include network connections, power connections or direct links, and wherein associations include defining components in a subgroup, in a security group, in a protected zone or in a storage group.

9. A computer-implemented method, comprising:
generating, by a processor of a computing device, a design that defines a computing system with at least a set of servers and connections between the set of servers to indicate an arrangement of the set of servers within the computing system based upon system component data extracted from a database, wherein the set of server are added to the design from the database by iteratively adding system components from the system component data to the design;
validating, by the processor, the design to create a validated design by determining whether the connections defined between the set of servers violate one or more of a set of design constraints that include a threshold to determine connection compatibility of the system components in the design, wherein a first attribute of a first system component and a second attribute of a second system component are evaluated to determine whether a connection between the first system component and the second system component is valid with respect to the threshold; and
utilizing the validated design to implement the computing system.

10. The computer-implemented method of claim 9, wherein generating the design includes:
(i) adding, by the processor, the set of servers occurs according to a first input, and
(ii) defining, by the processor, the connections between the servers according to a second input, wherein the connections include one or more of connections between the set of servers.

11. The computer-implemented method of claim 10, wherein the system components include servers, networking equipment, cabling or storage devices,
wherein defining the connections includes iteratively generating, by the processor, relationships that include the connections between servers of the set of servers, wherein the relationships include connections and associations between system components.

12. The computer-implemented method of claim 9, wherein generating the design with the set of servers includes selectively modifying, by the processor, attributes of servers in the set of servers to configure instances of the set of servers within the design.

13. The computer-implemented method of claim 9, further comprising:
displaying, by the processor, a graphical user interface (GUI) that includes the design to provide a visual representation of the computing system,
wherein generating the design includes generating, by the processor, the design based, at least in part, on inputs received through the GUI that add servers in the set of servers and define the connections between the set of servers,
wherein the inputs are drag and drop actions received through the GUI that are based, at least in part, on actions by a user, and wherein generating the connections includes generating, by the processor, the connections according to the drag and drop inputs that connect servers in the set of servers.

14. The computer-implemented method of claim 9, further comprising:
generating, by the processor, at least one report from the design in response to a request for the at least one report, wherein generating the at least one report includes generating documentation of the design, implementation information of the design and one or more estimates of the design, and wherein the design constraints include one or more rules for component mismatches.

15. The computer-implemented method of claim 9, further comprising:
generating, by the processor, a message when a constraint violation is determined; and
prohibiting, by the processor, a connection between two servers from being included in the design when the connection violates a design constraint.

16. The computer-implemented method of claim 9, wherein the design is a schematic of the computing system, wherein the computing system is a collection of hardware components that together provide one or more computing services.

17. A computing device, comprising:
a processor connected to memory; and
instructions, stored within the memory, that when executed by the processor cause the processor to:
generate a design that defines a computing system with a set of system components and connections between the set of system components to indicate an arrangement of the set of system components within the computing system based upon system component data extracted from a database, wherein the system components are added to the design from the database by iteratively adding system components to the design;
validate the design to create a validated design by using attributes of the set of system components to analyze the connections and determine whether the connections violate one or mote of a set of design constraints that include a threshold to determine connection compatibility of the system components in the design, wherein a first attribute of a first system component and a second attribute of a second system component are evaluated to determine whether a connection between the first system component and the second system component is valid with respect to the threshold; and
utilizing the validated design to implement the computing system.

18. The computing device of claim 17, wherein a design constraint comprises a rule for mismatched system components.

* * * * *

UNITED STATES PATENT AND TRADEMARK OFFICE
CERTIFICATE OF CORRECTION

PATENT NO. : 9,842,176 B2  
APPLICATION NO. : 14/270756  
DATED : December 12, 2017  
INVENTOR(S) : Lee Page 1 of 1

It is certified that error appears in the above-identified patent and that said Letters Patent is hereby corrected as shown below:

In the Claims

In Column 13, Line 23, in Claim 9, delete "server" and insert -- servers --, therefor.

In Column 13, Line 41, in Claim 10, after "servers" delete "occurs".

In Column 14, Line 51, in Claim 17, delete "mote" and insert -- more --, therefor.

Signed and Sealed this  
Thirty-first Day of July, 2018

Andrei Iancu  
*Director of the United States Patent and Trademark Office*